(12) United States Patent
Wiant et al.

(10) Patent No.: US 7,334,315 B2
(45) Date of Patent: Feb. 26, 2008

(54) METHOD OF SERVICING A CHANNEL BUS SPLICE ASSEMBLY

(75) Inventors: Jason P. Wiant, Bedford, TX (US); Harry W. Josten, Grapevine, TX (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 313 days.

(21) Appl. No.: 11/083,423

(22) Filed: Mar. 18, 2005

(65) Prior Publication Data
US 2006/0040538 A1    Feb. 23, 2006

Related U.S. Application Data

(62) Division of application No. 10/685,155, filed on Oct. 14, 2003, now Pat. No. 6,888,066.

(51) Int. Cl.
*H01S 4/00*    (2006.01)

(52) U.S. Cl. .............. 29/592.1; 29/426.1; 29/428; 29/469; 29/521; 29/524; 174/68.2; 174/68.3; 174/70 B; 174/71 B; 174/88 B; 361/605; 361/611; 361/648; 361/649; 439/212; 439/213

(58) Field of Classification Search ............... 29/426.1, 29/428, 469, 521, 524, 525.06, 592.1; 174/68.2, 174/68.3, 70 B, 71 B, 72 B, 88 B, 99 B, 174/129 B, 133 B, 149 B; 361/605, 611, 361/648, 649; 439/212, 213
See application file for complete search history.

(56) References Cited

U.S. PATENT DOCUMENTS

| | | | | |
|---|---|---|---|---|
| 6,040,976 | A * | 3/2000 | Bruner et al. ............... | 361/611 |
| 6,111,745 | A * | 8/2000 | Wilkie et al. ............... | 361/605 |
| 6,435,888 | B1 * | 8/2002 | Reed, Jr. ..................... | 439/213 |
| 6,521,837 | B2 * | 2/2003 | Hilgert et al. ............. | 174/99 B |
| 6,870,103 | B1 * | 3/2005 | Wiant et al. ............... | 174/68.2 |

* cited by examiner

*Primary Examiner*—Paul D. Kim
(74) *Attorney, Agent, or Firm*—Foley & Lardner LLP

(57) ABSTRACT

For use in switchgear equipment having channel bus bars joined together at a bus joint, there is provided a method of servicing and maintaining a channel bus splice assembly and method. The channel bus splice assembly comprises switchgear or switchboard equipment having channel bus bars joined together at a bus joint, there is provided a channel bus splice assembly. The channel bus splice assembly comprises an inner splice plate defining a plurality of throughbores. A sliding clamp plate is configured to reciprocally move within the inner splice plate. The sliding clamp plate defines a plurality of access ports. A pair of nut plates is coupled to the sliding clamp plate and having threaded orifices corresponding to selected throughbores in the inner splice plate. An outer splice plate having a plurality of throughbores corresponding to the threaded orifices in the nut plates.

4 Claims, 3 Drawing Sheets

METHOD OF SERVICING A CHANNEL BUS SPLICE ASSEMBLY

CROSS-REFERENCE TO RELATED PATENT APPLICATIONS

This application is a Division of U.S. application Ser. No. 10/685,155, filed Oct. 14, 2003, now U.S. Pat. No. 6,888,066 incorporated herein by reference in its entirety.

FIELD OF INVENTION

The present invention relates generally to the field of electrical switchboards and panel boards having bus bars, and more particularly to a channel bus splice assembly for use in switchgear and switchboard equipment.

BACKGROUND OF INVENTION

Switchgear assemblies, switchboards and panelboards are general terms which cover metal enclosures, housing switching and interrupting devices such as fuses, and circuit breakers, along with associated control, instrumentation and metering devices. Such assemblies typically include associated bus bars, interconnections and supporting structures used for the distribution of electrical power. Low voltage switchgear and switchboards operate at voltages up to 600 volts and with continuous currents up to 5000 amps or higher. Such devices are also designed to withstand short circuit currents ranging up to 200,000 amps (3 phase rms symmetrical).

Typical switchgear equipment is composed of a lineup of several metal enclosed sections. Each section may have several circuit breakers stacked one above the other vertically in the front of the section with each breaker being enclosed in its own metal compartment. Each section has a vertical or section bus which supplies current to the breakers within the section via short horizontal branch buses. The vertical bus bars in each section are supplied with current by a horizontal main bus bar that runs through the lineup of metal enclosed sections. A typical arrangement includes bus bars for each electrical phase of a multiple phase system which may include three power phases and a neutral.

The bus bars typically are joined by bus bar joints, also referred to as splice, in the switchgear switchboard line-up. Bus bar splices typically are assembled with bolts that must be accessible for routine maintenance, for example, tightening or replacing bus bars. Bus bar assemblies typically increase in thickness as the current rating of the switchgear equipment increases. It is also typical to provide insulation of various components within a switchgear or switchboard enclosure including a cover of the bus bar splices.

Thus, there is a need for a bus bar splice assembly for use in switchgear equipment that will allow maintenance of a bus bar splice. There is a further need for a bus joint splice assembly that provides access to the fasteners. There is an additional need for a bus bar cover assembly that can accommodate various current ratings (sizes) of bus bar joint.

SUMMARY

There is provided a method of servicing and maintaining a channel bus splice assembly connecting first and second channel bus bars in a switchgear assembly. The channel bus splice assembly includes a plurality of interior fasteners and a plurality of exterior fasteners, an interior splice plate, a sliding clamp plate having nut plates and an outer splice plate. The method comprises the steps of removing the exterior fasteners from the nut plates. Removing the outer splice plate. Moving the sliding clamp plate to one side until it stops, wherein access to some of the interior fasteners is obtained. Manipulating some of the interior fasteners. Moving the sliding clamp plate to the other side until it stops, wherein access to other of the interior fasteners is obtained. Manipulating other of the interior fasteners. Remounting the outer splice plate by passing the exterior fasteners through the outer splice plate and threading into the nut plates. The method can also include the steps of removing and reinstalling a bus joint cover and the step of replacing a member of the channel bus bar. The method can also include the step of manipulating one of torqueing the fasteners and replacement of the fasteners.

DETAILED DESCRIPTION OF THE EXEMPLARY EMBODIMENTS

Before describing exemplary embodiments of a bus joint cover assembly 30, several comments are appropriate. Switchgear assemblies and switchboard assemblies typically include vertical (section) bus bar 12 and horizontal bus bars 20 to distribute power within the assemblies. Bus bars can be flat and have a rectangular cross-section or bus bars can be C-shaped or U-shaped channels.

Figure 1:
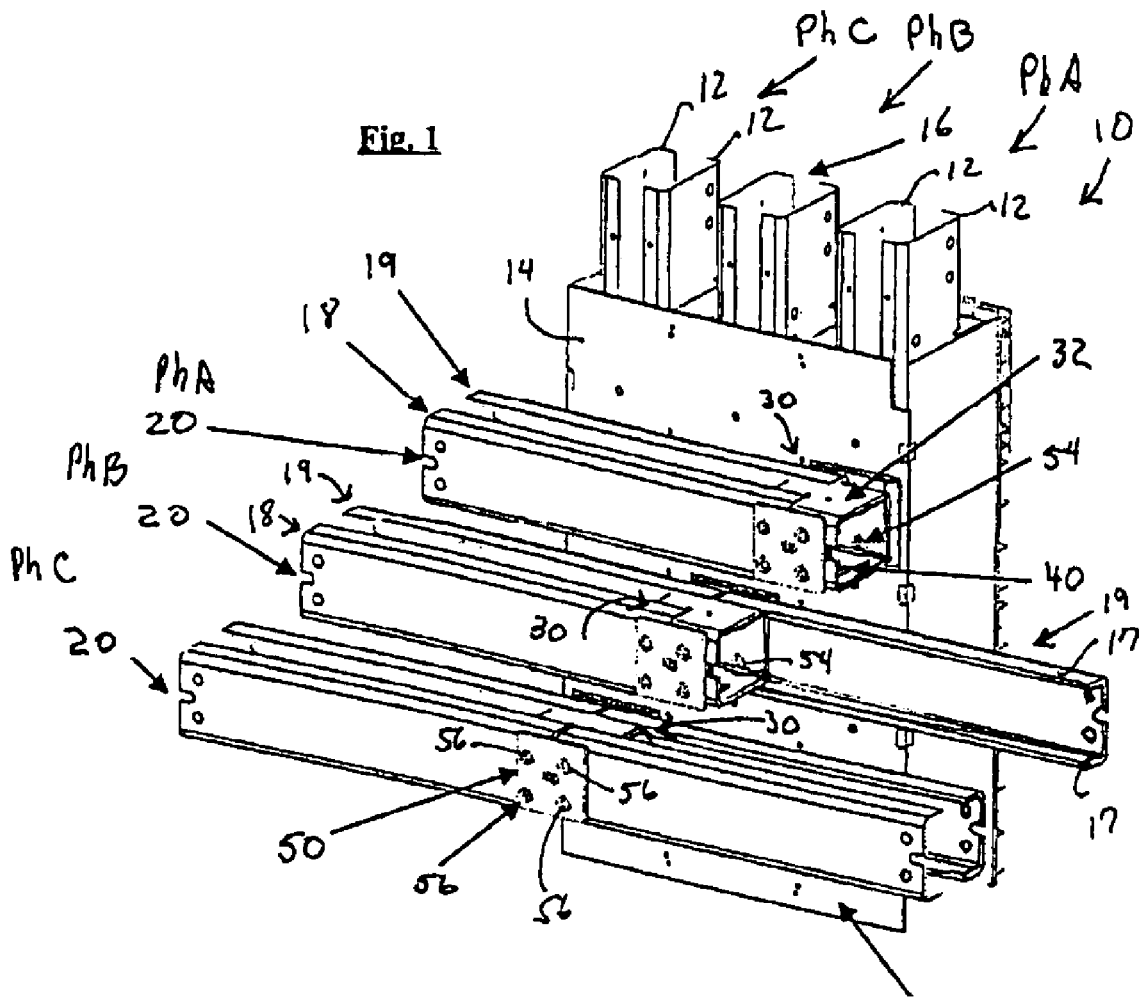
FIG. 1 is a perspective view of a partial, multiple phase switchgear equipment assembly including an exemplary embodiment of a channel bus splice assembly.
Figure 2:
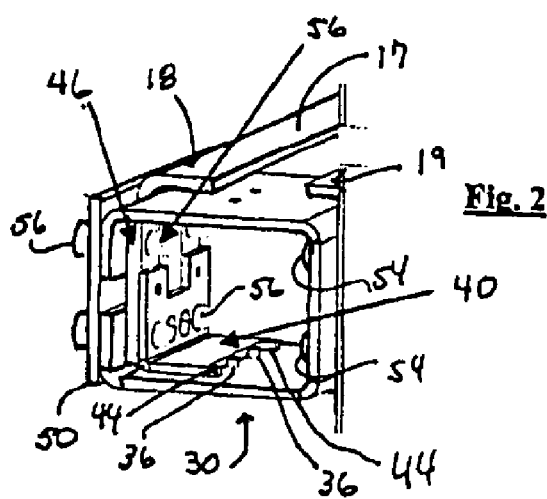
FIG. 2 is a perspective view of an exemplary embodiment of a channel bus joint assembly having a sliding clamp plate in a centered position with exterior fasteners installed.
Figure 5:
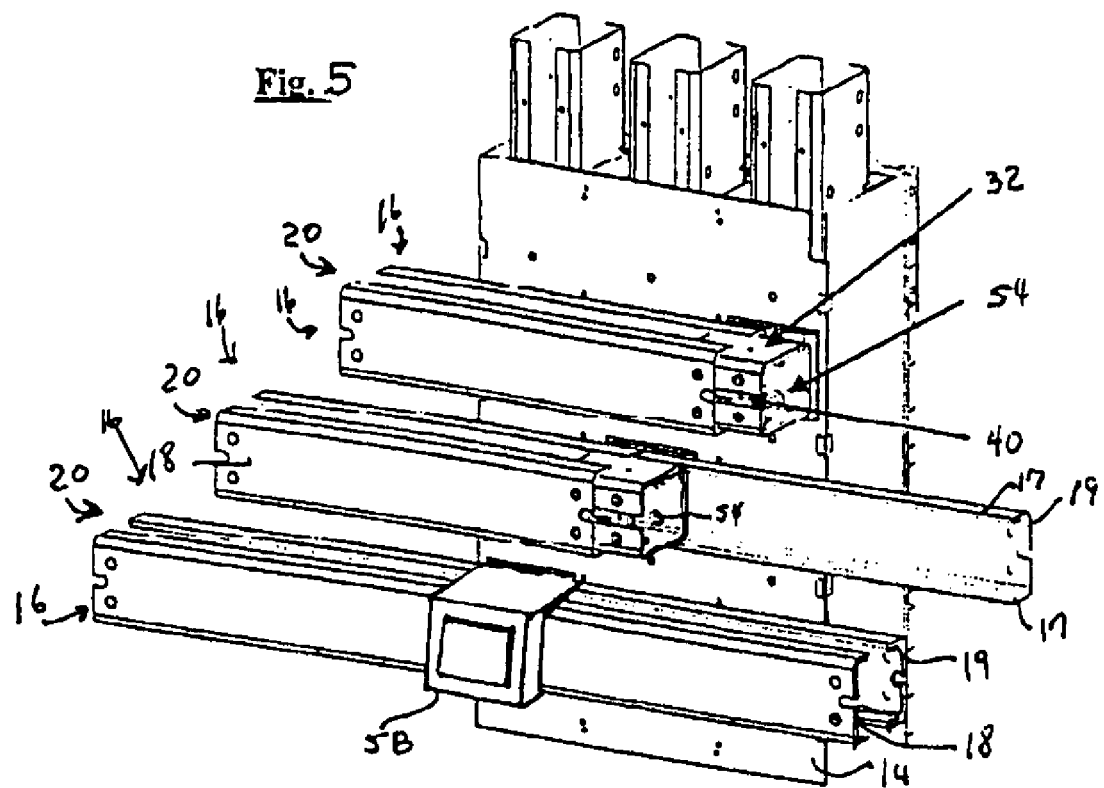
FIG. 5 is a perspective view of a partial multiple phase switchgear assembly including an exemplary embodiment of a channel bus splice assembly illustrating two splice assemblies with exterior fasteners and outer splice plates removed for maintenance, and illustrating a telescoping insulating cover on a channel bus splice assembly.

A C-shaped or U-shaped channel bus 16 resists bending and twisting in short-circuit current conditions and is stronger than a flat bar of comparable thickness. Further, the channel bus assembly can use one or multiple bars per phase thereby increasing the current density available in the system (See FIG. 1). In the multi-channel bus bar system, a first channel bus bar 18 and a second channel bar 19, each having flanges 17 are aligned with the flanges 17 facing each other as shown in FIGS. 1, 2 and 5. Also, inner channels can be nested inside the outer channels of each first and second channel bar of each phase. Since various configurations of bus bars can be used, a bus bar splice assembly that can be configured to accommodate such various configurations will be advantageous. A telescoping capability of an insulating splice cover allows the same cover to work with bus bars of varying thickness. The use of channel bus bars and the channel bus splice assembly provides high short-circuit withstand capability with substantially less bracing than other geometries.

Referring now to FIG. 1, there is illustrated a portion of a typical, three phase (PH-A, PH-B, PH-C) high current, insulated switch gear bus assembly 10. The vertical bus bars 12 (also referred to as section bus) are shown with optional insulating barriers 14 installed. The horizontal bus bars 20 are shown without an optional insulation sleeve. The horizontal bus bar joints 25 can be enclosed by a bus joint cover assembly 58 that may telescope in size.

Figure 6:
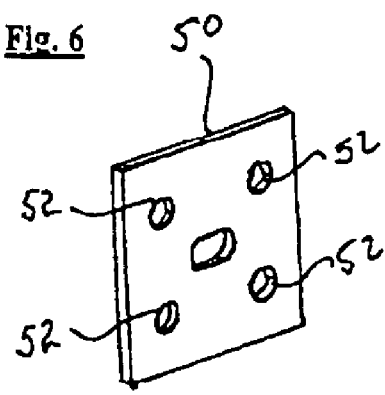
FIG. 6 is an illustration of an exemplary embodiment of an outer splice plate with a plurality of throughbores.
Figure 7:
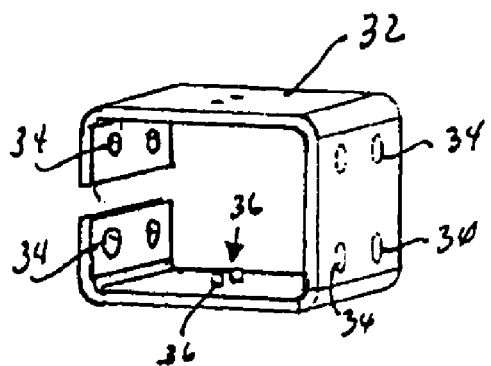
FIG. 7 is an illustration of an exemplary embodiment of an interior splice plate having a plurality of throughbores and spring pins placed at pre-selected points a distance (D) apart.
Figure 8:
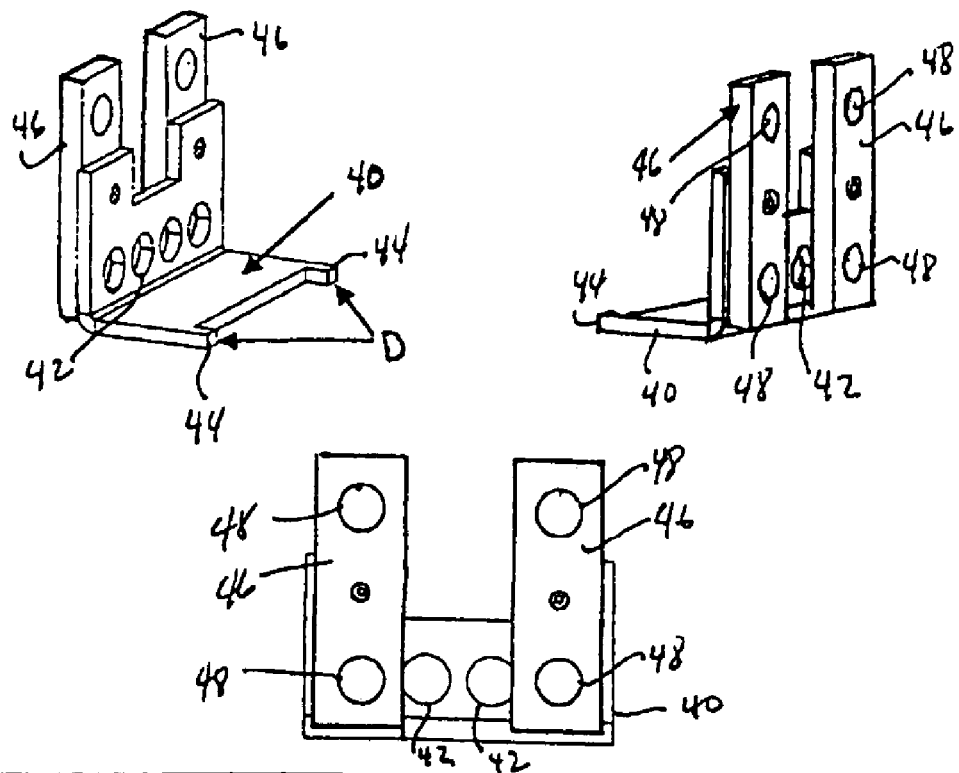
FIG. 8 illustrates several views of an exemplary embodiment of a sliding clamp plate coupled to two nut plates, each nut plate having a plurality of threaded orifices.

In switchgear equipment 10, utilizing channel bus bars, a typical arrangement is to utilize multiple channel bus bars. Typically there is an outer bus bar, herein referred to as first channel bus bar 18, and an interior channel bus bar, herein referred to as second channel bus bar 19. The first and second channel bus bars 18, 19 also typically are comprised of multiple members mounted end-to-end as illustrated in FIGS. 1 and 5. The end-to-end configuration together with the flange facing configuration of the first and second channel bus bars 18, 19 necessitates the use of a channel bus splice assembly 30. The channel bus splice assembly 30 can also be used with a single channel bus bar. In such arrangement, shim plates can be used to align the equipment. The channel bus splice assembly 30 includes an inner splice plate 32, a sliding clamp plate 40, a pair of nut plates 46 and an outer splice plate 50. See FIGS. 6-8.

The inner splice plate 32 is configured to fit between the flanges 17 of the channel bus bars 18, 19. The inner splice plate 32 defines a plurality of through bores 34 through which fasteners are inserted to secure the channel bus bars. (See FIG. 7.) The inner splice plate 32 is provided with pre-selected points 36 which define the distance of movement D for the sliding clamp plate 40. A pair of spring pins (also referred to as roll pins) can be set at such pre-selected points 36 to act as stops for the sliding clamp plate 40 by selectively abutting the feet 44 configured on the sliding clamp plate 40.

A sliding clamp plate 40 is configured to reciprocally move within the inner splice plate 32. The sliding clamp plate 40 defines a plurality of access ports 42 the function of which will be explained below. The sliding clamp plate 40 can be an angle plate configured with two spaced apart feet 44 which function to stop movement of the sliding clamp plate 40 at pre-selected points 36 within the inner splice plate 32.

A pair of nut plates 46 are coupled to the sliding clamp plate 40 and have threaded orifices 48 corresponding to selected through bores in the inner splice plate 32. The nut plates 46 are coupled to the sliding clamp plate 40 by fasteners, for example, spring pins or rivets of suitable size and strength for their intended use. (See FIG. 8.) The nut plates 46 could also be welded to the sliding clamp plate 40 or integrally formed with the sliding clamp plate 40 during fabrication.

The outer splice plate 50 has a plurality of through bores 52 which correspond to the threaded orifice 48 in the nut plates 46. (See FIG. 6.)

The various components of the channel bus splice 30 can be composed of metal of suitable composition and compatibility and strength with the channel bus bars 18, 19, for example copper and aluminum.

It should be noted that mounting holes in the first and channel bus bars 18, 19 are aligned on the same axis and have identical hole patterns. This allows for commonality of parts. The several through bores 34, 52 and threaded orifices 48 identified above are also configured to align on the same axis as the mounting holes in the several channel bus bars 18, 19. A first selection of fasteners 54 are configured to pass through the axis ports 42 and insert into the through bores 34 of the inner splice plate 32 wherein the inner splice plate 32 is secured to a channel bus bar 19 and a second selection of fasteners 56 are configured to pass through the through bores 52 in the outer splice plate 50 and thread into the nut plates 46 wherein another channel bus bar 18 is coupled between the outer splice plate 50 and the inner splice plate 32.

Figure 3:
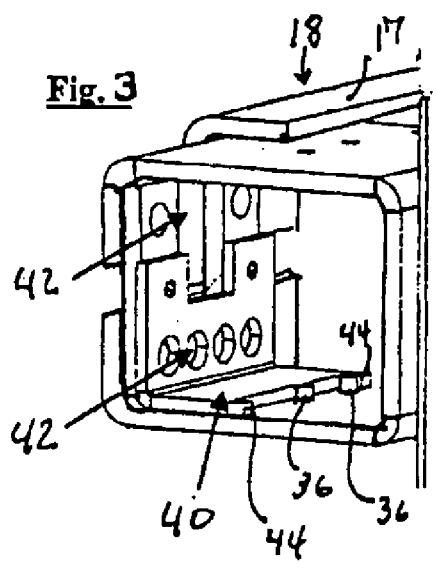
FIG. 3 is a perspective view of the channel bus bar joint assembly illustrated in FIG. 2 with the sliding clamp plate positioned to the left wherein access to the two right side interior fasteners is obtained.
Figure 4:
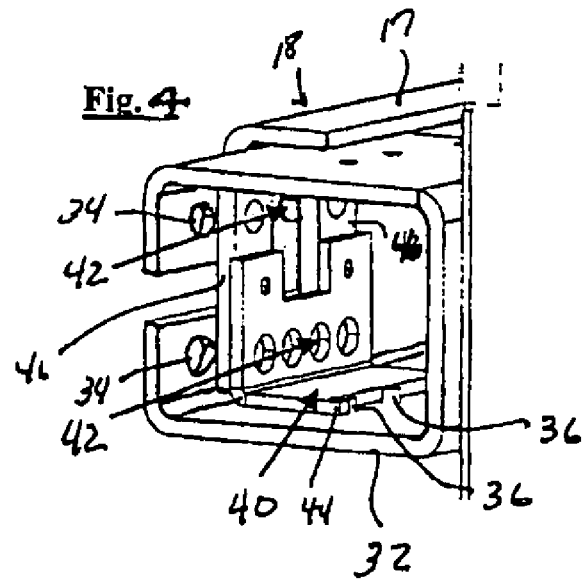
FIG. 4 is a perspective view of the channel bus joint assembly illustrated in FIG. 2 with the sliding clamp plate positioned to the right wherein access to the two left side interior fasteners is obtained.

Referring now to FIGS. 2, 3 and 4, there is illustrated an exemplary embodiment of a channel bus splice 30. A method of connecting a first and second channel bus bar 18, 19 in a switchgear assembly 10 with a channel bus splice assembly 30 will be described. Each channel bus bar includes two end-to-end members. For clarity purposes, only one member of each channel bus bar 18, 19 is illustrated in FIG. 2 so that the channel bus splice assembly 30 can be seen.

The method comprises the steps of installing an inner splice plate 32 of a channel bus splice assembly 30 between the flanges 17 of the channel bus bars 18 and 19. Coupling the inner splice plate 32 to one of the channel bus bars 19 with interior fasteners 54. Coupling a pair of nut plates 46 to a sliding clamp plate 40 and installing the sliding clamp plate 40 in the inner splice plate 32. The sliding clamp plate 40 is configured to reciprocally move within the inner splice plate 32 and define a plurality of access ports 42. Then mounting an outer splice plate 50, the plate having through bores 52, with an exterior fastener 56. The exterior fasteners 56 are configured to pass through the through bores 52 in the outer splice plate 50 and thread into the nut plates 46 wherein another channel bus bar 18 is coupled between the outer splice plate 50 and the inner splice plate 32.

FIG. 2 illustrates an internal view of the inner splice plate 32 and the sliding clamp plate 40 in an assembled position between the first and second channel bus bars 18 and 19 with the exterior fasteners threaded into the nut plates 46. The sliding clamp plate 40 is positioned with the spring pins in the pre-selected points 36 aligned an equal distance between the feet 44 of the sliding clamp plate 40.

FIG. 3 illustrates the sliding clamp plate 40 moved to one side of the inner splice plate 32 to the point where one of the spring pins 36 abuts against one of the feet 44 of the sliding clamp plate 40. Such alignment allows access to the two interior fasteners 54 through the access ports 42 to fasten the inner splice plate 32 to the interior channel bus bar 19. The upper interior fasteners 54 are accessible through the outer bus bar plate 50, the inner splice plate 32 and between the nut plates 46. The lower interior fasteners 54 are accessible through the outer bus bar plate 50, the inner splice plate 32, between the nut plates 46 and through an access port 42 in the sliding clamp plate 40. The diameters of the various through bores and distances between components are configured to provide clearance for a fastener and the tool used to torque the fasteners.

FIG. 4 illustrates the sliding clamp 32 moved to the other selected point 36 identified by the spring pin which is a pre-determined distance D between the feet 44 of the sliding clamp plate 40. Such position allows access to the two interior fasteners 54 on the right side of the channel bus splice assembly 30. The upper right interior fastener 54 is accessible through the outer bus bar 50, the inner bus plate 32 and between the nut plates 46. The lower right fastener is accessible through the outer bus plate 50, the inner splice plate 32, between the nut plates 46 and through an access port 42 in the sliding clamp plate 40, similarly as described above. In one embodiment, the interior 54 and exterior fasteners 56 are configured alike. In another embodiment the interior fasteners 54 and the exterior fasteners 56 are configured differently to accommodate different tool clearances.

An advantage of the present channel bus splice assembly 30 is that the channel bus bars 18 and 19 do not have to be completely removed in order to gain access to and torque the fasteners in the interior channel bus bar 19. The method of servicing and maintaining a channel bus splice assembly 30 for connecting a first and second channel bus bar 18, 19 in a switchgear assembly 10 is hereby disclosed. Each channel bus bar 18, 19 may include two end-to-end members. The channel bus splice assembly 30 includes a plurality of interior fasteners 54 and a plurality of exterior fasteners 56, an interior splice plate 32, a sliding clamp plate 40 having nut plates 46 and an outer splice plate 50. (Such components are described above.) The method comprises the steps of removing the exterior fasteners 56 from the nut plates 46 and removing the outer splice plate 50. Moving the sliding clamp plate 40 to one side of the inner splice plate 32 until it stops, wherein access to some of the interior fasteners 54 is obtained and manipulating some of the interior fasteners 54. Manipulating can include torqueing the fasteners either to tighten or loosen the fastener and replacement of the fastener in the event that it is broken, stripped or otherwise damaged. Moving the sliding clamp plate 40 to another side of the inner splice plate 32 until it stops, wherein access to other of the interior fasteners 54 is obtained. Manipulating the other of the interior fasteners 54 and remounting the outer splice plate 50 by passing the exterior fasteners 56 through the outer splice plate 50 and threading the fasteners 56 into the nut plates 46.

The channel bus splice assembly 30 may be provided with an insulating cover 58 that must be removed before servicing or maintaining the channel bus splice assembly 30 and then reinstalled the cover 58 upon completion of such servicing and maintenance. During such operation, a channel bus bar member may be replaced in the event it is damaged or otherwise requiring service.

While the embodiments illustrated in the figures and described above are presently disclosed, it should be understood that these embodiments are offered by way of example only. The channel bus bar splice assembly is not intended to be limited to any particular embodiment, but is intended to extend to various modifications that nevertheless flow within the scope of the intended claim. For example, the channel bus bar splice assembly can be used on vertical bus bars. Other modifications will be evident to those will ordinary skill in the art.

The invention claimed is:

1. A method of servicing and maintaining a channel bus splice assembly connecting first and second channel bus bars in a switchgear assembly, with the channel bus splice assembly including a plurality of interior fasteners and a plurality of exterior fasteners, an inner splice plate, a sliding clamp plate having nut plates and an outer splice plate, the method comprising the steps of:

removing the exterior fasteners from the nut plates;

removing the outer splice plate;

moving the sliding clamp plate to one side until it stops, wherein access to some of the interior fasteners is obtained;

manipulating some of the interior fasteners;

moving the sliding clamp plate to another side until it stops, wherein access to other of the interior fasteners is obtained;

manipulating other of the interior fasteners; and remounting the outer splice plate by passing the exterior fasteners through the outer splice plate and threading into the nut plates.

2. The method of claim 1, further comprising the steps of removing a bus joint cover and reinstalling the bus joint cover.

3. The method of claim 1, wherein the step in manipulating includes one of torque and replacement of the fastener.

4. The method of claim 1, further comprising the step of replacing one of the first and second channel bus bars.

\* \* \* \* \*